United States Patent [19]

Trotter et al.

[11] 4,169,116

[45] Sep. 25, 1979

[54] BLENDS OF SUBSTANTIALLY AMORPHOUS OLEFIN COPOLYMERS AND COMPATIBLE TACKIFYING RESINS USEFUL AS HOT-MELT, PRESSURE-SENSITIVE ADHESIVES

[75] Inventors: Jimmy R. Trotter; Frederick B. Joyner; Richard L. McConnell, all of Kingsport, Tenn.

[73] Assignee: Eastman Kodak Company, Rochester, N.Y.

[21] Appl. No.: 849,372

[22] Filed: Nov. 7, 1977

[51] Int. Cl.$^2$ .................... C08L 23/12; C08L 23/18; C08L 23/20
[52] U.S. Cl. ................... 525/210; 525/216; 525/232
[58] Field of Search .............. 260/897; 526/350

[56] References Cited

U.S. PATENT DOCUMENTS

| | | | |
|---|---|---|---|
| 3,356,766 | 12/1967 | Ware | 260/897 |
| 3,900,694 | 8/1975 | Jurrens | 260/897 X |
| 3,954,697 | 5/1976 | McConnell et al. | 526/350 |

*Primary Examiner*—Carman J. Seccuro
*Attorney, Agent, or Firm*—Clyde L. Tootle; Daniel B. Reece, III

[57] ABSTRACT

This invention relates to blends of compatible tackifiers with substantially amorphous olefin copolymers containing at least one $C_3$ to $C_5$ linear α-olefin and 40 to 60 mole percent of at least one $C_6$ to $C_{10}$ linear α-olefin which are useful as hot-melt, pressure-sensitive adhesives. The unmodified copolymer base resins have melt viscosities in the range of >75,000 cp up to about 1,000,000 cp at 190° C. The addition of the compatible tackifiers to the copolymer base resin causes a dramatic and unexpected increase in the shear adhesion failure time in addition to improved coatability as well as substantial increases in probe tack and peel adhesion values of the copolymers.

10 Claims, No Drawings

BLENDS OF SUBSTANTIALLY AMORPHOUS OLEFIN COPOLYMERS AND COMPATIBLE TACKIFYING RESINS USEFUL AS HOT-MELT, PRESSURE-SENSITIVE ADHESIVES

This invention relates to hot melt pressure sensitive adhesive compositions having a novel combination of properties. More specifically, the invention relates to blends of compatible tackifiers with substantially amorphous olefin copolymers containing at least one $C_3$ to $C_5$ linear α-olefin and 40 to 60 mole percent of at least one $C_6$ to $C_{10}$ linear α-olefin which are useful as hot-melt, pressure-sensitive adhesives.

Pressure-sensitive adhesives that have good tack and adhere to numerous substrates are widely used by industry in various applications such as in consumer products. For example, one such application is in the construction of floor tiles having a preapplied adhesive for the do-it-yourself market. In this application the pressure-sensitive adhesive is thinly coated onto the undersurface of floor tiles and covered with a protective release sheet. Installation of the floor tiles is accomplished by removing the release sheet and pressing the tile into place. The pressure-sensitive adhesives presently used in this type application contain either a styrene-butadiene rubber or a styrene-isoprene rubber. Although these pressure-sensitive adhesives provide adequate adhesive properties, they have certain deficiencies that limit their usefulness. These adhesives have poor resistance to plasticizer migration and consequently in applications such as use on floor tiles allow the plasticizer in the tile to migrate into the adhesive thereby causing the adhesive to soften and string excessively. These prior adhesives also have poor heat stability as evidenced by an excessive change in viscosity when exposed to a temperature of 350° F. (the application temperature) for 24 hours. Another disadvantage of these prior adhesives is that they are expensive to produce because of the large amounts of rubber required in the composition to obtain adequate adhesive properties. Therefore, it would be an advance in the state of the art to have a hot-melt pressure-sensitive adhesive that has good adhesive properties without the disadvantages associated with prior pressure-sensitive adhesives.

In accordance with the present invention, blends comprising compatible tackifiers with substantially amorphous olefin copolymers containing at least one $C_3$ to $C_5$ linear α-olefin and 40 to 60 mole percent of at least one $C_6$ to $C_{10}$ linear α-olefin are useful as hot-melt, pressure-sensitive adhesives.

In previous work with certain propylene/1-hexene copolymers containing 40 to 60 mole percent 1-hexene, copolymers having melt viscosities less than 75,000 cp (measured by ASTM D1238) are readily coated by hot-melt techniques on backing materials and provide good pressure-sensitive adhesive properties. However, it was observed that copolymers with melt viscosities greater than 75,000 cp were difficult to coat and the coatings had striations in them. When certain compatible tackifiers are added to these copolymers having >75,000 cp, it was surprising to find that not only was the melt viscosity of the blend substantially reduced, as expected, but certain pressure-sensitive adhesive properties were substantially improved in an unpredictable manner. For example, the addition of compatible tackifiers to substantially amorphous olefin copolymers derived from at least one monomer selected from propylene, 1-butene or 1-pentene with 40 to 60 mole percent of at least one higher α-olefin of 6 to 10 carbon atoms and having a melt viscosity of >75,000 cp causes a dramatic and unexpected increase in the shear adhesion failure time in addition to substantial increases in probe tack and peel adhesion values of the copolymers.

The compatible tackifying resins useful in the adhesive compositions of this invention can be a hydrocarbon resin such as DAC-B hydrocarbon resin prepared according to the process disclosed in U.S. Pat. No. 3,701,760 as well as other hydrocarbon resins, polyterpenes or synthetic polyterpenes, and the like. One such hydrocarbon tackifying resin is a hydrocarbon resin having a softening point of about 100° C. and available commercially as Resin H-100 from Eastman Chemical Products, Inc. Other hydrocarbon tackifying resins can be prepared by the polymerization of monomers consisting primarily of olefins and diolefins and include, for example, the residual by-product monomers resulting from the manufacture of isoprene. These hydrocarbon tackifying resins typically exhibit a Ring and Ball softening point of from about 80° C. to about 135° C.; an acid number of from about 0–2, a saponification value of less than about 1; and an iodine value of from about 30 to 100. Examples of such commercially available resins based on a $C_5$-olefin fraction of this type are "Wingtack" 95 and "Wingtack" 115 tackifying resins sold by Goodyear Tire and Rubber Company, the Sta-Tac and Betaprene A or H resins sold by Reichhold Chemical Corporation, Arkon resins sold by Arakawa Forest Chemical Industries, and Escorez resins sold by Exxon Chemical Co.

Also other suitable resins are the terpene polymers such as the polymeric, resinous materials obtained by polymerization and/or copolymerization of terpene hydrocarbons such as the alicyclic, monocyclic, and bicyclic monoterpenes and their mixtures, including alloocimene, carene, isomerized pinene, pinene, dipentene, terpinene, terpinolene, limonene, terpentine, a terpene cut or fraction, and various other terpenes. Particularly useful starting materials are terpene mixtures containng at least 20 percent beta-pinene and/or limonene or dipentene (racemic limonene), and the "sulfate terpentine" obtained as a by-product in the sulfate pulping process. Commercially available resins of the terpene type include the Zonarez terpene B-Series and 7000 Series resins from Arizona Chemical Corp. and Nirez resins from Reichhold Chemical Corp. The typical properties reported for the Zonarez terpene resins include Ring and Ball softening points of about 55° to 125° C. (ASTM E-28-67), color of 2 to 3 (Gardner 1963, 50% in heptane), acid number of less than 1 (ASTM D465-59), saponification number of less than 1 (ASTM D464-59) and specific gravity at 25° C. of 0.96 to 0.99 (ASTM D1963-61).

The hydrocarbon resins, polyterpenes, or other compatible tackifying resins can be used either alone or in combination. The operable concentration of these tackifiers is about 5 to about 50 weight percent tackifier. The preferred concentration range for these compatible tackifiers is about 10 to about 40 weight percent. Incompatible tackifiers such as those based on wood rosin esters or polyindene are not useful in the practice of this invention since blends containing them are grainy and hazy. Furthermore, the presence of the incompatible tackifiers reduces the tack of the copolymers to a very low level.

The base copolymers for the blends of this invention may be made according to the procedure described in U.S. Pat. No. 3,954,697. Operable melt viscosity limits for these copolymers include >75,000 cp up to about 1,000,000 cp, with the preferred melt viscosity range being >75,000 cp to about 850,000 cp at 190° C. Such copolymers contain 40–60 mole percent higher-1-olefin and for all practical purposes are essentially amorphous. For example, these useful copolymers show little or no crystallinity by either X-ray or DSC techniques.

It was also found that Tg and density measurements are useful for the characterization of useful copolymers. One suitable method for measuring the Tg (glass transition temperature) of polymers is by Differential Scanning Calorimetry [John Mitchell and Jen Chiu, Anal. Chem. Annual Reviews, 43 267R (1971); M. J. O'Neill and R. L. Fyans, "Design of Differential Scanning Calorimeters and the Performance of a New System", paper presented at the Eastern Analytical Symposium, New York City, November, 1971]. Density of polymers is generally determined in a density gradient tube (ASTM Method D1505). It has been found that useful copolymers have a density of about >0.86 and a Tg intermediate between that observed for polypropylene (or poly-1-butene) and that of the higher poly-1-olefins. For example, polypropylene has a Tg of about −20° C. and poly-1-hexene has a Tg of about −50° C. (J. Brandrup and E. H. Immergut, Editors, "Polymer Handbook", Interscience Publishers, New York City, 1966). Useful propylene/1-hexene copolymers containing 40–60 mole percent 1-hexene normally show Tg values of about −30° to −45° C. If the copolymer is too "blocky" (i.e., contains relatively long segments of propylene), the copolymer will have a density of >0.86 and it will show a Tg value greater than about −25° C.

The NMR spactra can also be used to characterize the pressure-sensitive adhesives of this invention. For example, carbon-13 NMR spectra of operable propylene/1-hexene/1-octene copolymers determined in a mixture of o-dichlorobenzene and deuterobenzene as solvent and hexamethyldisiloxane as an internal standard shows a single peak at 12.2 ppm. and a multiplicity of peaks centered at about 19.7, 18.9 and 18.1 ppm. The single peak at about 12.2 ppm. is due to the presence of the methyl group in the side groups of the 1-hexene and 1-octene monomer units. The three sets of multiplets are due to the methyl side groups of the propylene monomer units. There are three sets of multiplets since there are triads of propylene monomer units present in all three possible types of stereoregular configurations (e.g., lll or ddd triads, ddl or lld triads, and ldl or dld triads). These new pressure-sensitive adhesive polymers appear to be multiblock copolymers of higher 1-olefin and propylene (or 1-butene or 1-pentene) wherein the propylene (or 1-butene or 1-pentene) blocks are partly stereoregular and partly heterotactic segments which are predominantly <20 monomer units long and wherein the higher 1-olefin blocks are incapable of crystallization at least over the use temperature range of −20° to 180° F. We believe these substantially amorphous copolymers contain a very low order of polypropylene-type (or 1-butene type or 1-pentene type) crystallinity which accounts for their good cohesive strength in pressure-sensitive adhesive applications.

This structural interpretation of these copolymers is in accord with the following measurable parameters:

Density range, g./cc.: 0.85–0.86

Tg range, ° C. (glass transition temperature): −30 to −45

Tm (crystalline melting point): No measurable Tm by DCS-1B instrument. A weak endotherm at about 40°–45° C. can sometimes be detected with DSC-2 instrument.

The type of catalyst and the polymerization conditions required to provide such copolymers are quite limited. In general, the best results have been achieved by using catalyst systems which provide poor stereoregulation in the polymerization of propylene of 1-butene. Combinations of $Et_3Al$ with $AATiCl_3$ with Al/Ti molar ratios ranging from about 1:1 to 5:1 have been found to be useful. It is also generally desirable to conduct the polymerization at relatively high temperatures such as from about 140 to about 170° C., preferably 150°–160° C., to provide copolymers having adequate pressure-sensitive adhesive properties.

If catalysts which provide highly stereoregular propylene homopolymer are used to copolymerize propylene or 1-butene or 1-pentene, with hexene, heptene, octene, nonene, and decene, multiblock copolymers are often formed which contain crystallizable propylene or 1-butene or 1-pentene segments. Such copolymers usually have inadequate pressure-sensitive adhesive properties. Examples of highly stereospecific catalysts (for the polymerization of propylene) which provide this results include $EtAlCl_2/Bu_3N/TiCl_3$, $EtAlCl_2/HPT/TiCl_3$, and $Et_2ElCl/HPT/TiCl_3$ catalysts ($Bu_3N$ = tributylamine; HPT = hexamethylphosphoric triamide).

Unmodified copolymers with melt viscosity greater than 75,000 cp are not generally useful as hot-melt, pressure-sensitive adhesives since they do not coat well on backing materials with currently available hot melt coaters.

The following test methods are the ones used to evaluate the hot-melt, pressure-sensitive adhesives of this invention.

1. The melt viscosities of the adhesives are determined according to ASTM Procedure D1238.

2. The glass transition temperatures of the adhesives are determined using a differential scanning calorimeter (Perkin-Elmer DSC-2 instrument) operating over the range of −70° C. to +200° C.

3. The Ring and Ball softening points of the tackifying resins are determined according to ASTM Procedure E28.

4. The probe tack values of the coated tapes are determined according to the method as described by Testing Machines, Inc., Amityville, New York, the manufacturer of the Polyken Probe Tack Tester (Model TMI80-2). The probe tack values are determined at 23° C. with the Polyken Probe Tack Tester using a 0.5 cm diameter probe, 100 g/cm² contact pressure, two-second contact time, and 2 cm/second separation speed.

5. The 180° peel adhesion values of the coated tapes are determined according to the Pressure Sensitive Tape Council's PSTC-1 test. The amount of adhesive residue left on the stainless steel testing panels when the bonds are tested is also noted.

6. The shear adhesion failure times of the coated tapes are determined according to the Pressure Sensitive Tape Council's PSTC-7 test.

7. The bleed-through (staining) resistance of the adhesives is determined by coating the adhesives from the melt (190° C.) 0.001 to 0.002 inches thick on 60 pound Kromekote paper with a heated doctor blade. The coated paper tapes are then aged at 70° C. in a forced draft oven, and the degree of bleed-through on the paper backing is visually observed periodically up to four weeks.

8. The thermal stabilities of the adhesives are determined by heating the adhesives to 177° C. in the presence of air for 24 hours in a Brookfield Thermosel viscometer. As a measure of thermal stability, the melt viscosities of the adhesives are determined with the viscometer at 177° C. after 1, 4, 8, 12 and 24 hours and differences from the initial melt viscosity are noted. Char and film formation are also noted.

9. The compatibilities of the various base polymers with the tackifying resins are determined by melting samples of each blend between glass microscope slides on a Mettler hot stage attachment for a microscope. The temperature of the melt is raised to about 150° C., photomicrographs are made, and phase separation (if any) is noted.

The following examples show the unpredicted and surprising advantages obtained when compatible tackifiers are used as modifiers according to the teachings of this invention. For example, the addition of compatible tackifiers to substantially amorphous olefin copolymers of at least one α-olefin selected from propylene, 1-butene, and 1-pentene and at least one higher α-olefin of 6 to 10 carbon atoms and having a melt viscosity greater than 75,000 cp at 190° C. causes a dramatic and unexpected increase in the shear failure time in addition to substantial increase in probe tack and peel adhesion values of the copolymers. It should be noted that the values obtained will depend somewhat on the degree of homogenization of the blend as well as on the thickness and smoothness of the polymer coating. Thus, the pressure-sensitive properties of the blends of this invention may vary by as much as 10–25% depending on the blend method and on the quality of the coating.

The pressure-sensitive adhesive compositions of this invention are prepared by blending together the two components in the melt at a temperature of about 160° C. to about 200° C. until a homogeneous blend is obtained. Various methods of blending materials of this type are known to the art and any method that produces a homogeneous blend is satisfactory. These components blend easily in the melt and a heated vessel equipped with a stirrer is all that is required. For example, a Cowles stirrer provides an effective mixing means for preparing these hot-melt pressure-sensitive adhesive compositions.

In addition to the polyolefin and tackifier, it is desirable for the hot-melt pressure-sensitive adhesive composition to contain about 0.1 to about 1.5 percent by weight, preferably about 0.25 percent to 1.0 percent by weight, of one or more stabilizers or antioxidants. Antioxidants that are effective for each of the various components can be used. Such antioxidants include, for example, "Ionox" 220 and 330 [tris(di-t-butyl-p-hydroxybenzyl)-trimethylbenzene], "Dalpac" 4C2 [2,6-di(t-butyl)-p-cresol], "Naugawhite" (alkylated bisphenol), "Butyl Zimate" (zinc dibutyl dithiocarbamate), and "Ethyl" 702 [4,4'-methylene bis(2,6-di-tert-butyl-phenol)]. A particularly effective antioxidant is Irganox 1010 which is identified as pentaerythritol tetrakis[3-(3,5-di-tert-butyl-4-hydroxyphenyl)propionate].

There are numerous uses for the pressure-sensitive adhesives of the present invention. One such use is in the construction of women's sanitary napkins. A strip of the pressure-sensitive adhesive may be applied to the polyethylene shield of the napkin and then protected by a release sheet. At the time of use, the release sheet is removed and the napkin is held in place by adhering the pressure-sensitive adhesive to the undergarment, thus eliminating the need for belts and pins. Removal of the napkin is quick as it strips cleanly from the garment.

Another use of the adhesives of this invention is in the construction of floor tiles having a preapplied adhesive for the do-it-yourself market. The pressure-sensitive adhesive is thinly coated onto the undersurface of such floor tiles and covered with a protective release sheet. Quick and permanent installation of the floor tiles is accomplished by removing the release sheet and pressing the tile into place. This technique of installing floor tiles can be extended to other types of coverings such as wall tiles and ceiling tiles. Other major uses for the pressure-sensitive adhesives include their use on tapes and labels.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

Poly(48-propylene-co-52-[1-hexene]) [30 g; 100,000 cp at 190° C. by ASTM D1238; Tg −31° C.], 10 g of Wingtack 95 tackifying resin (a synthetic polyterpene hydrocarbon type tackifying resin based on a $C_5$ olefin fraction; Ring and Ball softening point=100+5° C., iodine number=30, specific gravity=0.93); and 0.1 g of Irganox 1010 antioxidant (pentaerythritol tetrakis[3-(3,5-ditertbutyl-4-hydroxyphenyl)propionate]) are melt blended in a Brabender Plastograph (sigma blade mixer; rotor speed=50 rpm) at 170° C. for 30 minutes under an atmosphere of nitrogen. The clear compatible blend is removed from the mixer and allowed to cool to 23° C. At 23° C., the blend is very tacky to the touch. The melt viscosity of the blend is 31,800 cp at 190° C. when measured with a Tinius Olsen Melt Indexer (ASTM D1238) using an 0.04 inch orifice and 2160 g weight. The blend has a glass transition temperature (Tg) of −20° C.

A sample of the blend is placed in a Brookfield Thermosel Viscometer (where it shows a melt viscosity of 89,000 cp at 177° C.) and is maintained at 177° C. for 24 hours in contact with air. The sample does not change in melt viscosity during this period and it does not show any evidence of char formation or film formation on the surface of the melt.

The blend is coated from the melt (190° C.) 0.001±0.0002 inch thick onto Mylar film (0.001 inch thick) using a heated doctor blade. The resulting pressure-sensitive tapes are transparent and have a probe tack value of 1139 g/0.5 cm diameter probe and a 180° peel adhesion value of 4.2 pounds/inch-width after ageing tapes 24 hours at 23° C. and 50% R.H. No adhesive residue is left when the coated tapes are peeled from the stainless steel test panels. The tapes have shear adhesion failure times of greater than 10,000 minutes when using a 1000 g static load per square inch of bond area. The probe tack and 180° peel adhesion values are not affected when tapes are aged for one week at 50° C. Coated taped made using 60 pound Kromekote paper are aged in an oven at 70° C. for four weeks. These aged paper tapes show no evidence of bleed-through. Similarly good results are achieved using Wingtack 115 tackifying resin (Ring and Ball softening point=1-

15–120° C., molecular weight=1400 to 1500) instead of Wingtack 95.

The unmodified poly(48-propylene-co-52-[1-hexene]) has a probe tack value of 504 g/0.5 cm diameter probe, a 180° peel adhesion value of 3.7 pounds/inch-width, and a shear adhesion failure time of 6476 minutes.

EXAMPLE 2

The procedure of Example 1 is repeated except that 38 g of poly(48-propylene-co-52-[1-hexene]) having a melt viscosity of 100,000 cp at 190° C. is blended with 2 g of Wingtack 95 to prepare a blend having a melt viscosity of 72,000 cp at 190° C. Pressure-sensitive tapes made with this blend have a probe tack value of 767 g/0.5 cm diameter probe, a peel adhesion value of 3.9 pounds/inch, and a shear adhesion failure time of 8250 minutes.

EXAMPLE 3

The procedure of Example 1 is repeated except that 34 g of poly(50-propylene-co-50-[1-hexene]) having a melt viscosity of 240,000 cp at 190° C. is melt blended with 6 g of Wingtack 95 resin to provide a blend with a melt viscosity of 110,000 cp at 190° C. This blend is compatible and pressure-sensitive tapes made with this blend have a probe tack value of 810 g/0.5 cm diameter probe, a peel adhesion value of 3.3 pounds/inch, and a shear adhesion failure time of greater than 10,000 minutes.

EXAMPLE 4

The procedure of Example 1 is repeated except that 26 g of poly(50-propylene-co-50-[1-hexene]) having a melt viscosity of 240,000 cp at 190° C. is melt blended with 14 g of Wingtack 95 resin to provide a blend with a melt viscosity of 42,000 cp at 190° C. This blend is compatible and coated tapes have a probe tack value of 903 g/0.5 cm diameter probe, peel adhesion value of 4.3 pounds/inch, and a shear adhesion failure time of greater than 10,000 minutes.

EXAMPLE 5

The procedure of Example 1 is repeated except that 20 g of a poly(50-propylene-co-50-[1-hexene]) having a melt viscosity of 821,000 cp at 190° C. is blended with 20 g of Wingtack 95 resin to provide a blend having a melt viscosity of 150,000 cp at 190° C. The blend is permanently tacky and coated tapes have a shear adhesion failure time of greater than 10,000 minutes.

EXAMPLE 6

The procedure of Example 1 is repeated except that 20 g of poly(50-propylene-co-50-[1-hexene]) having a melt viscosity of 1,000,000 cp at 190° C. is blended with 20 g of Wingtack 95 resin to provide a blend having a melt viscosity of 182,000 cp at 190° C. Pressure-sensitive tapes made with this blend are permanently tacky and have a shear adhesion failure time of greater than 10,000 minutes.

Because of the very high melt viscosity of the unmodified copolymer, pressure-sensitive tapes could not be made using the unmodified copolymer.

EXAMPLE 7

The procedure of Example 1 is repeated except that 30 g of poly(50-propylene-co-50-[1hexene]) having a melt viscosity of 76,000 cp at 190° C. is blended with 10 g of Wingtack 95 resin to provide a blend having a melt viscosity of 24,500 cp at 190° C. Pressure-sensitive tapes made with this blend have a probe tack value of 1070 g/0.5 cm diameter probe, a peel adhesion value of 4.4 pounds/inch, and a shear adhesion failure time of greater than 10,000 minutes.

The unmodified poly(50-propylene-co-50-[1-hexene]) has a probe tack value of 560 g/0.5 cm diameter probe, a peel adhesion value of 3.2 pounds/inch, and a shear adhesion failure time of 5,560 minutes.

EXAMPLE 8

The procedure of Example 1 is repeated except that 30 g of poly(59-propylene-co-41-[1-hexene]) having a melt viscosity of 90,000 cp at 190° C. is blended with 10 g of Zonarez 7100 resin (a polyterpene type tackifying resin; Ring and Ball softening point=100° C.)[ASTM E28-67, color 3 (Gardner 1963, 50% in heptane) and specific gravity at 25° C. of 0.97 (ASTM D1963-61)] to provide a blend having a melt viscosity of 28,700 cp at 190° C. Pressure-sensitive tapes made with this blend have a probe tack value of 1090 g/0.5 cm diameter probe, a peel adhesion value of 4.9 pounds/inch, and a shear adhesion failure time of greater than 10,000 minutes.

EXAMPLE 9

The procedure of Example 1 is repeated except that 30 g of poly(42-propylene-co-58-[1-hexene]) having a melt viscosity of 108,000 cp at 190° C. is blended with 10 g of Eastman resin H-100 tackifying resin (a DAC-B hydrocarbon type tackifying resin; Ring and Ball softening point=100° C.) to provide a blend having a melt viscosity of 36,000 cp at 190° C. Pressure-sensitive tapes made with this blend have a probe tack value of 1120 g/0.5 cm diameter probe, a peel adhesion value of 4.5 pounds/inch, and a shear adhesion failure time of 7,500 minutes.

EXAMPLE 10

The procedure of Example 1 is repeated except that 30 g of poly(50-propylene-co-9-[1-butene]-co-41-[1-hexene]) having a melt viscosity of 105,000 cp at 190° C. is blended with 10 g of Wingtack 95 resin to provide a blend having a melt viscosity of 32,800 cp at 190° C. Pressure-sensitive tapes made with this blend have a probe tack value of 1210 g/0.5 cm diameter probe, a peel adhesion value of 4.8 pounds/inch, and a shear adhesion failure time of 8,350 minutes.

EXAMPLE 11

The procedure of Example 1 is repeated except that 30 g of poly(50-[1-butene]-co-50-[1-hexene]) having a melt viscosity of 125,000 cp at 190° C. is blended with 10 g of Wingtack 95 resin to provide a blend having a melt viscosity of 39,400 cp at 190° C.

Pressure-sensitive tapes made with this blend have a probe tack value of 1300 g/0.5 cm diameter probe, a peel adhesion value of 5.1 pounds/inch, and a shear adhesion failure time of 200 minutes.

The unmodified poly(50-[1-butene]-co-50-[1-hexene]) has a probe tack value of 790 g/0.5 cm diameter probe, a peel adhesion value of 3.7 pounds/inch, and a shear adhesion failure time of 85 minutes.

EXAMPLE 12

The procedure of Example 1 is repeated except that 30 g of poly(50[1-pentene]-co-50-[1-hexene]) having a melt viscosity of 87,000 cp at 190° C. is blended with 10 g of Wingtack 95 resin to provide a blend having a melt viscosity of 29,500 cp at 190° C. Pressure-sensitive tapes made with this blend have a probe tack value of 1245 g/0.5 cm diameter probe, a peel adhesion value of 4.9 pounds/inch, and a shear adhesion failure time of 180 minutes.

The unmodified poly(50-[1-pentene]-co-50-[1-hexene]) has a probe tack value of 780 g/0.5 cm diameter probe, a peel adhesion value of 3.5 pounds/inch, and a shear adhesion failure time of 70 minutes.

EXAMPLE 13

The procedure of Example 1 is repeated except that 30 g of poly(30-propylene-co-10-[1-butene]-co-10-[1-pentene]-co-50-[1-hexene]) having a melt viscosity of 350,000 cp at 190° C. is blended with 10 g of Wingtack 95 resin to provide a blend having a melt viscosity of 109,000 cp at 190° C. Pressure-sensitive tapes made with this blend have a probe tack value of 1190 g/0.5 cm diameter probe, a peel adhesion value of 5.4 pounds/inch, and a shear adhesion failure time of 6,210 minutes.

EXAMPLE 14

The procedure of Example 1 is repeated except that 30 g of poly(55-propylene-co-25-[1-hexene]-co-20-[1-octene]) having a melt viscosity of 270,000 cp at 190° C. is blended with 10 g of Wingtack 95 resin to provide a blend having a melt viscosity of 79,000 cp at 190° C. Pressure-sensitive tapes made with this blend have a probe tack value of 1330 g/0.5 cm diameter probe, a peel adhesion value of 4.3 pounds/inch, and a shear adhesion failure time of 2,200 minutes.

The unmodified poly(55-propylene-co-25-[1-hexene]-co-20-[1-octene]) has a probe tack value of 580 g/0.5 cm diameter probe, a peel adhesion value of 3.1 pounds/inch, and a shear adhesion failure time of 1,025 minutes.

EXAMPLE 15

The procedure of Example 1 is repeated except that 30 g of poly(55-propylene-co-20-[1-hexene]-co-15-[1-octene]-co-10-[1-decene]) having a melt viscosity of 192,000 cp at 190° C. is blended with 10 g of Wingtack 95 resin to provide a blend having a melt viscosity of 63,000 cp at 190° C. Pressure-sensitive tapes made with this blend have a probe tack value of 1210 g/0.5 cm diameter probe, a peel adhesion value of 4.6 pounds/inch, and a shear adhesion failure time of 1640 minutes.

The unmodified poly(55-propylene-co-20-[1-hexene]-co-15-[1-octene]-co-10-[1-decene]) has a probe tack value of 710 g/0.5 cm diameter probe, a peel adhesion value of 3.4 pounds/inch, and shear adhesion failure time of 750 minutes.

EXAMPLE 16

The procedure of Example 1 is repeated except that 30 g of poly(50-propylene-co-25-[1-hexene]-co-25-[1-heptene]) having a melt viscosity of 82,000 cp at 190° C. is blended with 10 g of Wingtack 95 resin to provide a blend having a melt viscosity of 26,100 cp at 190° C. Pressure-sensitive tapes made with this blend have a probe tack value of 1115 g/0.5 cm diameter probe, a peel adhesion value of 4.2 pounds/inch, and a shear adhesion failure time of 9,670 minutes.

The unmodified poly(50-propylene-co-25-[1-hexene]-co-25-[1-heptene]) has a probe tack value of 735 g/0.5 cm diameter probe, a peel adhesion value of 3.5 pounds/inch, and a shear adhesion failure time of 4,950 minutes.

The following examples (Examples 17 and 18) show that incompatible tackifiers are not operable in the practice of this invention. For example, the addition of incompatible tackifiers such as Foral 105 resin (a wood rosin ester tackifier) and Picco 6100 (a polyindene type tackifier) to the copolymers causes the coatings to be grainy and hazy and reduces the probe tack values of the blends to such a low level that they are no longer useful as pressure-sensitive adhesives.

EXAMPLE 17

The procedure of Example 1 is repeated except that 30 g of poly(48-propylene-co-52-[1-hexene]) having a melt viscosity of 100,000 cp at 190° C. is blended with 10 g of Picco 6100 resin (a polyindene type tackifying resin; Ring and Ball softening point=100° C.) to provide a blend having a melt viscosity of 45,000 cp at 190° C. Pressure-sensitive tapes made with this blend have a probe tack value of 180 g/0.5 cm diameter probe.

EXAMPLE 18

The procedure of Example 1 is repeated except that 30 g of poly(50-propylene-co-9-[1-butene]-co-41-[1-hexene]) having a melt viscosity of 105,000 cp at 190° C., is blended with 10 g of Foral 105 resin (a pentaerythritol ester of hydrogenated rosin; Ring and Ball softening point=105° C.) to provide a blend having a melt viscosity of 39,500 cp at 190° C. Pressure-sensitive tapes made with this blend have a probe tack value of 265 g/0.5 cm diameter probe.

Although the invention has been described in considerable detail with particular reference to certain preferred embodiments thereof, variations and modifications can be effected within the spirit and scope of the invention.

We claim:

1. An adhesive composition capable of being used as a hot-melt, pressure-sensitive adhesive comprising a blend of
   (1) about 95 to 50 weight percent of a substantially amorphous olefin copolymer containing at least one $C_3$ to $C_5$ linear alpha-olefin and 40 to 60 mole percent of at least one higher alpha-olefin of 6 to 10 carbon atoms, said copolymer having a melt viscosity of >76,000 to 1,000,000 centipoise at 190° C., and
   (2) 5 to 50 weight percent of at least one compatible tackifying resin.

2. An adhesive composition according to claim 1 wherein said compatible tackifying resin is at least one hydrocarbon tackifying resin.

3. An adhesive composition capable of being used as a hot-melt, pressure-sensitive adhesive comprising a blend of
   (1) 90 to 60 weight percent of a substantially amorphous copolymer containing at least one $C_3$ to $C_5$ linear alpha-olefin and 40 to 60 mole percent of at least one higher alpha-olefin of 6 to 10 carbon atoms, said copolymer having a melt viscosity of >76,000 to 1,000,000 centipoise at 190° C., and
   (2) 10 to 40 weight percent of at least one compatible tackifying resin selected from the group consisting of hydrocarbon resins, and polyterpene resins.

4. An adhesive composition according to claim 3 wherein said compatible tackifying resin is at least one polyterpene resin.

5. An adhesive composition according to claim 3 wherein said compatible tackifying resin is at least one hyrocarbon resin.

6. An adhesive composition according to claim 5 wherein said hydrocarbon tackifying resin has a Ring and Ball softening point of from about 80° C. to about 130° C., an acid number of from about 0–2, a saponification value of less than about 1, an iodine value of from about 30 to 100.

7. An adhesive composition according to claim 6 wherein said hydrocarbon tackifying resin is DAC-B hydrocarbon resin.

8. An adhesive composition according to claim 6 wherein said hydrocarbon tackifying resin is Wingtack 95 hydrocarbon resin.

9. An adhesive composition according to claim 6 wherein said hydrocarbon tackifying resin is Wingtack 115 hydrocarbon resin.

10. An adhesive composition according to claim 4 wherein said polyterpene tackifying resin is Zonarez 7100 terpene hydrocarbon resin.

* * * * *